US012785924B2

(12) United States Patent
King et al.

(10) Patent No.: US 12,785,924 B2
(45) Date of Patent: Nov. 3, 2026

(54) DISAGGREGATED DATA CENTER PLANNING USING HOMOMORPHIC ENCRYPTION

(71) Applicant: International Business Machines Corporation, Armonk, NY (US)

(72) Inventors: Justin King, Rochester, MN (US); Cedric James Speltz, Byron, MN (US); Joseph Michael Sptizer, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 98 days.

(21) Appl. No.: 18/931,646

(22) Filed: Oct. 30, 2024

(65) Prior Publication Data

US 2026/0121830 A1 Apr. 30, 2026

(51) Int. Cl.
*H04L 9/00* (2022.01)

(52) U.S. Cl.
CPC .................................... *H04L 9/008* (2013.01)

(58) Field of Classification Search
None
See application file for complete search history.

(56) References Cited

U.S. PATENT DOCUMENTS 10,075,288 B1 * 9/2018 Khedr ..................... H04L 9/008
10,254,987 B2 4/2019 Shrader et al.
10,394,475 B2 8/2019 Li et al.
10,901,918 B2 1/2021 Ramasamy et al.
2018/0024957 A1 1/2018 Nachimuthu et al.
2019/0354413 A1 * 11/2019 Bivens .................. G06F 9/5083
2020/0371692 A1 11/2020 Van et al.
2021/0119766 A1 4/2021 Suresh et al.
(Continued)

OTHER PUBLICATIONS

Boudguiga, et al., "Homomorphic Encryption at Work for Private Analysis of Security Logs", In Proceedings of the 6th International Conference on Information Systems Security and Privacy, Jan. 2020, pp. 515-523.
(Continued)

*Primary Examiner* — Farid Homayounmehr
*Assistant Examiner* — Suman Debnath
(74) *Attorney, Agent, or Firm* — Cantor Colburn LLP; Edward Wixted

(57) ABSTRACT

A technique of configuring a disaggregated data center including a plurality of compute nodes communicatively coupled by a communication network to a plurality of distributed memory nodes includes receiving, via the communication network, at least one of a plurality of homomorphically-encrypted (HE) logs of memory accesses from the plurality of distributed memory nodes. Based on the HE logs, a function set S' is computed over each of the HE logs to obtain a result set R'. A portion of result set R' is distributed to each of the distributed memory nodes via the communication network, and a corresponding portion of plaintext result set R is requested from each of the distributed memory nodes. Based on receiving plaintext result set R, an assignment of resources of the distributed memory nodes to the compute nodes is determined, and the disaggregated data center is configured based on the assignment.

18 Claims, 4 Drawing Sheets

(56) References Cited

U.S. PATENT DOCUMENTS

| | | | |
|---|---|---|---|
| 2021/0344479 | A1 | 11/2021 | Lee et al. |
| 2022/0038478 | A1 | 2/2022 | Boudguiga et al. |

OTHER PUBLICATIONS

Deutsch, et al., "DAGguise: Mitigating Memory Timing Side Channels", ASPLOS '22, Feb. 28-Mar. 4, 2022, 15 pages.

Funk, M., The Power Of Power10's Memory Inception Clustering, The Next Platform, Aug. 13, 2021, 24 pages.

How Nlyte Asset Optimizer Helps You, Data Center Asset Lifecycle Management & Capacity Planning Software, Retrieved from https://www.nlyte.com/products/nlyte-asset-optimizer/., 2024, 11 pages.

SDC2022, Memory Disaggregation and Pooling with CXL, SNIAVideo, Retrieved from: https://www.youtube.com/watch?v=guefZgKQPM8, 2022, 2 pages.

Shan, et al., Towards a Fully Disaggregated and Programmable Data Center, Proceedings of the 13th ACM SIGOPS Asia-Pacific Workshop on Systems, Aug. 30, 2022, 11 pages.

* cited by examiner

DISAGGREGATED DATA CENTER PLANNING USING HOMOMORPHIC ENCRYPTION

BACKGROUND OF THE INVENTION

The present invention relates in general to data processing, and more specifically, to configuration of disaggregated data centers.

Disaggregated data centers, in which compute, storage, and networking resources are decoupled and pooled, offer significant flexibility and scalability advantages over other data processing architectures. Effectively configuring these systems to meet diverse workload requirements remains a complex technical challenge. Existing configuration techniques generally attempt to concurrently accommodate workload heterogeneity, support resource scalability, and limit management complexity, all while preserving data privacy.

SUMMARY OF THE INVENTION

In accordance with one or more embodiments, a disaggregated data center includes a plurality of compute nodes communicatively coupled by a communication network to a plurality of distributed memory nodes. Configuring the disaggregated data center includes receiving, via the communication network, at least one of a plurality of homomorphically-encrypted (HE) logs of memory accesses from the plurality of distributed memory nodes. Based on the HE logs, a function set S' is computed over each of the HE logs to obtain a result set R'. A portion of result set R' is distributed to each of the distributed memory nodes via the communication network, and a corresponding portion of plaintext result set R is requested from each of the distributed memory nodes. Based on receiving plaintext result set R, an assignment of resources of the distributed memory nodes to the compute nodes is determined, and the disaggregated data center is configured based on the assignment.

Figure 1:
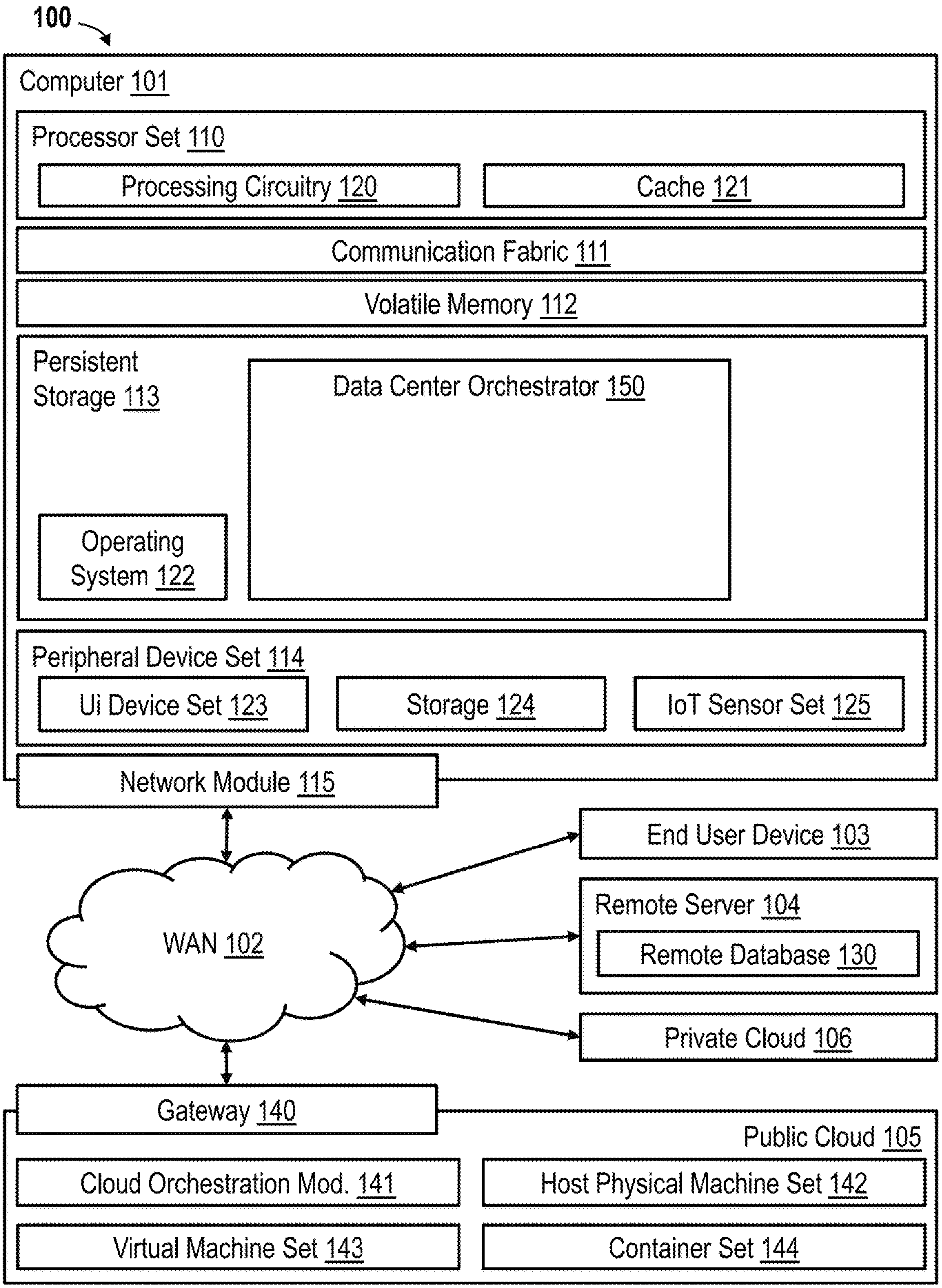
FIG. 1 is a high-level block diagram of an exemplary data processing environment in accordance with one or more embodiments.

In accordance with common practice, various features illustrated in the drawings may not be drawn to scale. Accordingly, dimensions of the various features may be arbitrarily expanded or reduced for clarity. In addition, some of the drawings may not depict all of the components of a given system, method, or device. Finally, like reference numerals may be used to denote like or corresponding features in the specification and figures.

DETAILED DESCRIPTION OF ILLUSTRATIVE EMBODIMENT

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

With reference now to FIG. 1, computing environment 100 contains an example of an environment for the execution of at least some of the computer code, such as data center orchestrator 150, involved in performing the inventive methods. In addition, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and other code and data), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one or more computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located “off chip.” In some computing environments, processor set 110 may be designed for working with qubits and performing quantum computing.

Computer-readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as “the inventive methods”). These computer-readable program instructions are stored in various types of computer-readable storage media, such as cache 121 and the other storage media discussed below. The program instructions, and associated data, are accessed by processor set 110 to control and direct performance of the inventive methods. In computing environment 100, at least some of the instructions for performing the inventive methods may be implemented in data center orchestrator 150 in persistent storage 113.

Communication fabric 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet-of-Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer-readable program instructions for performing the inventive methods can typically be downloaded to computer 101 from an external computer or external storage device through a network adapter card or network interface included in network module 115.

WAN 102 is any wide area network capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End User Device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from WAN 102 entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Those of ordinary skill in the art will appreciate that the architecture and components of a data processing environment can vary between embodiments. Accordingly, the exemplary computing environment 100 given in FIG. 1 is not meant to imply architectural limitations with respect to the claimed invention.

Figure 2:
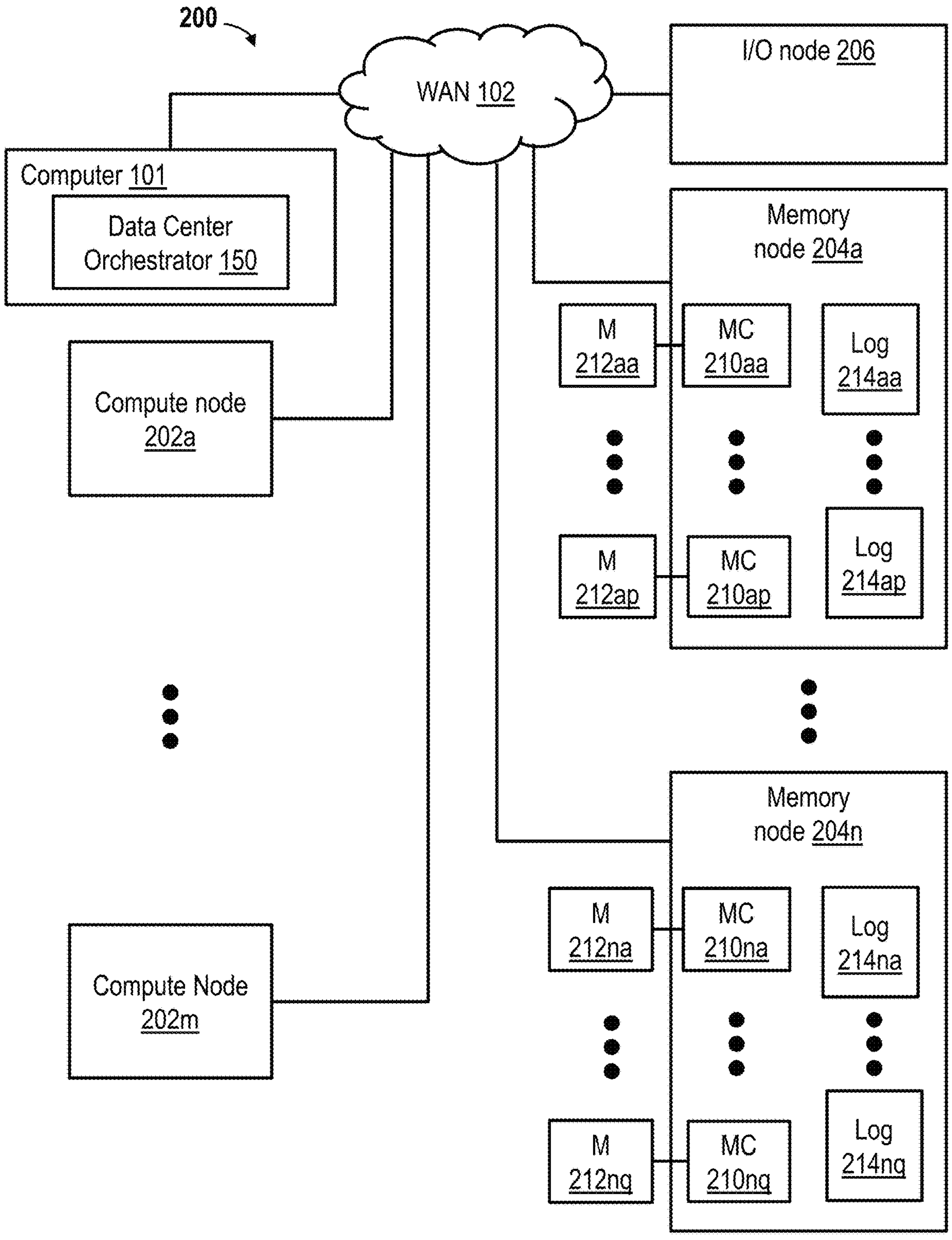
FIG. 2 is a high-level block diagram of a disaggregated data center in accordance with one or more embodiments.

Referring now to FIG. 2, there is depicted a high-level block diagram of a disaggregated data center 200 in accordance with one or more embodiments. Disaggregated data center 200 can be implemented, for example, in computing environment 100 of FIG. 1, and, as such, can include a computer 101 executing a data center orchestrator 150.

Disaggregated data center 200 further includes a plurality of compute nodes 202_a_-202_m_, each of which can be implemented, for example, as a computer 101, remote server 104, or host physical machine set 142. Compute nodes 202 are communicatively coupled by WAN 102. Disaggregated data center 200 additionally includes at least one separate I/O (input/output) node 206 providing I/O resources, such as connections to additional communication networks and/or persistent storage devices. Disaggregated data center 200 additionally includes a plurality of memory nodes 204_a_-204_n_ coupled to WAN 102. Each of memory nodes 204, which can be implemented, for example, by a computer 101 having a large amount of installed volatile memory 112, includes one or more memory controllers 210 each supporting access to a respective memory 212. For example, memory node 204_a_ includes memory controllers 210_aa_-210_ap_ having respective associated memories 212_aa_-212_ap_. Similarly, memory node 204_n_ includes memory controllers 210_na_-210_nq_ having respective associated memories 212_na_-212_nq_. Each of memory controllers 210 creates and maintains a respective log 214 of read and write accesses to the associated memory 212. Thus, memory controllers 210_aa_-210_ap_ of memory node 204_a_ create and maintain logs

214*aa*-214*ap*, and memory controllers 210*na*-210*nq* of memory node 204*n* create and maintain logs 214*na*-214*nq*.

In disaggregated data center 200, data center orchestrator 150 seeks to optimize the assignment of memory nodes 204 to compute nodes 202 based on the memory access histories recorded in logs 214. In order to reduce security risks and to prevent collateral attacks on the workloads of compute nodes 202, it is desirable for the memory access histories of the workloads to be shared with data center orchestrator 150 in a privacy-preserving manner. In a preferred embodiment, privacy of the contents of logs 214 is maintained through implementation of homomorphic encryption, as discussed below with reference to FIGS. 3-4.

Figure 3:
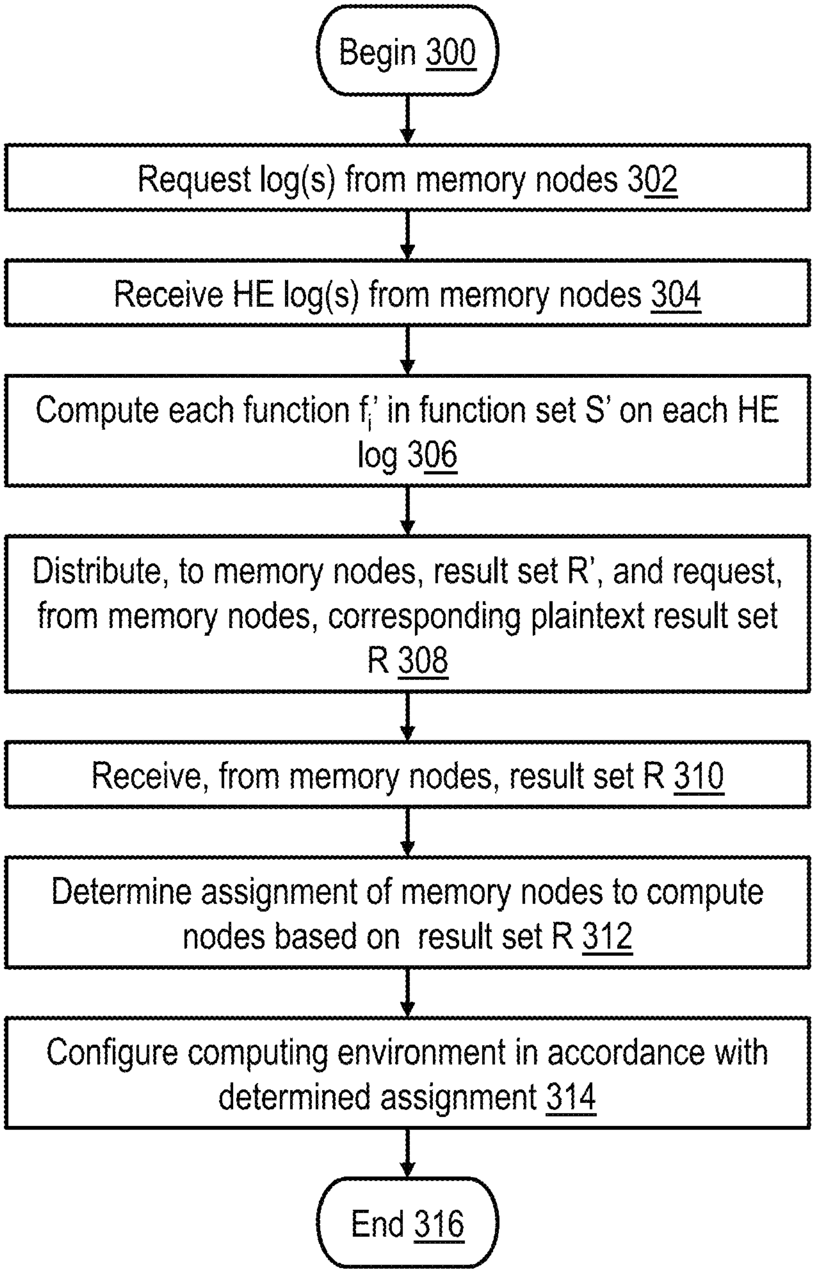
FIG. 3 is a high-level logical flowchart of an exemplary process by which an orchestrator configures a disaggregated data center in accordance with one or more embodiments.

With reference now to FIG. 3, there is illustrated a high-level logical flowchart of an exemplary process by which a data center orchestrator 150 executing on computer 101 configures disaggregated data center 200 in accordance with one or more embodiments. Specifically, in the illustrated process, data center orchestrator 150 assigns memory nodes 204 to compute nodes 202 in accordance with historical memory access patterns recorded in logs 214. The process of FIG. 3 begins at block 300, for example, in response to a change in membership of data center 200, for example, by the addition and/or removal of one or more compute nodes 202 and/or one or more memory nodes 204, or in response to a modification of the resources or workload (s) of one or more individual compute nodes 202 and/or memory nodes 204.

The process then proceeds from block 300 to block 302, which illustrates data center orchestrator 150 transmitting to memory nodes 204, via WAN 102, one or more requests for logs 214. In response to the log requests issued at block 302, data center orchestrator 150 receives from memory nodes 204 a copy of each log 214 protected by homomorphic encryption (block 304). In a preferred embodiment, each of these homomorphically-encrypted (HE) logs can include, for example, encrypted metadata (e.g., access counts and workload memory footprints) regarding prior read and write accesses to an associated memory 212 occurring within a predetermined or configurable historical time window. At block 306, data center orchestrator 150 applies a set S' of different homomorphic functions $\{f_1, f_2, \ldots, f'_i\}$ to the encrypted metadata (i.e., the ciphertext) in each HE-protected log, where each homomorphic function $f'_i$ in S' corresponds to a respective associated plaintext function $f_i$ such that $HE_{Dec}[f'_i(HE_{Enc}(x))]f_i(x)$, and where $HE_{Enc}$ and $HE_{Dec}$ refer to homomorphic encryption and homomorphic decryption operations, respectively. Data center orchestrator 150 obtains, as a result of performing function set S' on each log, a result set $R'=\{S'(HE_{Enc}(\text{Log } 1)), S'(HE_{Enc}(\text{Log } 2)), \ldots, S'(HE_{Enc}(\text{Log } N))\}$.

The process of FIG. 3 then proceeds from block 306 to block 308, which illustrates data center orchestrator 150 distributing, to each memory node 204 via WAN 102, the portion of result set R' pertaining to its logs 214 and requesting, from each memory node 204, a corresponding portion of a plaintext result set $R=\{HE_{Dec}[S'(HE_{Enc}(\text{Log } 1))], HE_{Dec}[S'(HE_{Enc}(\text{Log } 2))], \ldots, HE_{Dec}[S'(HE_{Enc}(\text{Log } N))]\}$. In response to the request issued at block 308, data center orchestrator 150 receives, for each log 214, the computation of $\{f_1(x), f_2(x), \ldots, f_i(x)\}$ without requiring the computation of set S' of homomorphic functions (or a corresponding set S of plaintext functions) on memory nodes 204 and without exposing the plaintext content of logs 214 to potential attack on WAN 102 (block 310).

At block 312, data center orchestrator 150 determines an assignment of the resources of memory nodes 204 to compute nodes 202 based on result set R received at block 310. Data center orchestrator 150 can determine the assignment based, for example, on memory access counts of workloads executed on compute nodes 202, the amount of memory consumed by the workloads executed on compute nodes 202, and, optionally, different or additional criteria. In some embodiments, the resources of a given memory node 204 may be assigned to be shared by multiple compute nodes 202. Following the determination of the assignment of memory nodes 204 to compute nodes 202 at block 312, data center orchestrator 150 configures data center 200 in accordance with the assignment determined at block 312, such that compute nodes 202 utilize the memory resources of the assigned memory nodes 204 in the execution of their workloads (block 314). The configuration of data center 200 may include, for example, data center orchestrator 150 establishing information specifying the assignment in one or more storage locations, for example, one or more memory locations and/or configuration registers. Following block 314, the process of FIG. 3 ends at block 316. Thereafter, in operation, compute nodes 202 access memory resources in memory nodes 204 in accordance with the configuration, for example, by each compute node 202 restricting its read and write memory accesses to the memory node(s) 204 assigned to that compute node 202.

Figure 4:
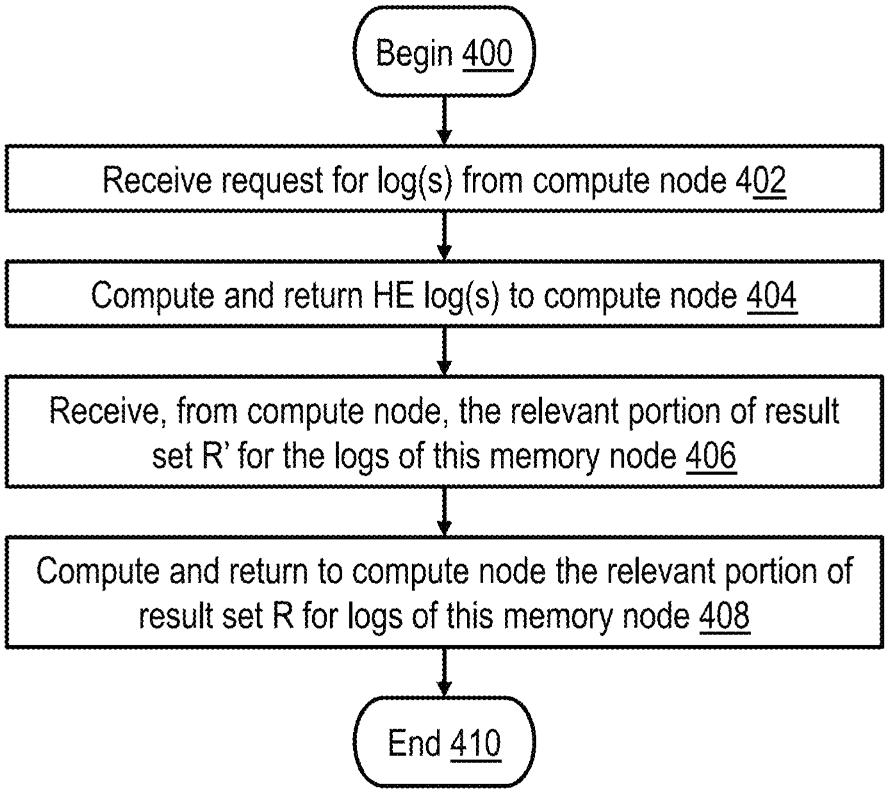
FIG. 4 is a high-level logical flowchart of an exemplary process by which a memory node participates in configuration of a disaggregated data center in accordance with one or more embodiments.

Referring now to FIG. 4, there is depicted a high-level logical flowchart of an exemplary process by which a memory node 204 participates in configuration of a disaggregated data center 200 in accordance with one or more embodiments. The illustrated process can be performed, for example, by a memory controller 210 or a processing circuitry 120 of a memory node 204, which are hereafter collectively referred to as "memory node processing circuitry."

The process of FIG. 4 begins at block 400 and then proceeds to block 402, which illustrates memory node processing circuitry receiving, from data center orchestrator 150 via WAN 102, a request for logs 214. The issuance of this request for the logs 214 by data center orchestrator 150 is illustrated at block 302 of FIG. 3. In response to the request for logs 214, the memory node processing circuitry computes ciphertext representing the contents of each of its logs 214 utilizing homomorphic encryption (i.e., $HE_{Enc}(\text{Log } 1), \ldots, HE_{Enc}(\text{Log P})$) and transmits the HE logs to data center orchestrator 150 via WAN 102 (block 404).

The process then proceeds from block 404 to block 406, which illustrates the memory node processing circuitry receiving from the data center orchestrator 150 the portion of result set R' relevant to that memory node 204 (i.e., the subset of R' computed based on the HE logs from that memory node 204). Based on the relevant portion of R', the memory node processing circuitry 120 computes, utilizing homomorphic decryption, a relevant portion of the plaintext result set $R=\{HE_{Dec}[S'(HE_{Enc}(\text{Log } 1))], HE_{Dec}[S'(HE_{Enc}(\text{Log } 2))], \ldots, HE_{Dec}[S'(HE_{Enc}(\text{Log } N))]\}$ and returns that subset of R to data center orchestrator 150 (block 408). Thereafter, the process of FIG. 4 ends at block 410.

As has been described, according to one or more embodiments, a technique of configuring a disaggregated data center including a plurality of compute nodes communicatively coupled by a communication network to a plurality of distributed memory nodes includes receiving, via the communication network, at least one of a plurality of homomorphically-encrypted (HE) logs of memory accesses from the plurality of distributed memory nodes. Based on the HE logs, a function set S' is computed over each of the HE logs to obtain a result set R'. A portion of result set R' is distributed to each of the distributed memory nodes via the communication network, and a corresponding portion of plaintext result set R is requested from each of the distributed memory nodes. Based on receiving plaintext result set R, an assignment of resources of the distributed memory nodes to the compute nodes is determined, and the disaggregated data center is configured based on the assignment.

While the present invention has been particularly shown as described with reference to one or more preferred embodiments, it will be understood by those skilled in the art that various changes in form and detail may be made therein without departing from the spirit and scope of the invention.

The following definitions are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, system or apparatus that comprises a list of elements is not necessarily limited to only those elements but can include other elements not expressly listed or inherent to such composition, mixture, process, method, article, system or apparatus.

Additionally, the term "exemplary" is used herein to mean "serving as one example, instance or illustration." Any embodiment or design described herein as "exemplary" is not necessarily to be construed as preferred or advantageous over other embodiments or designs. The terms "at least one" and "one or more" shall be understood to include any integer number greater than or equal to one, and the term "plurality" shall be understood to include any integer number greater than or equal to two. The term "coupled" shall include both indirect connection and a direct connection, unless specified otherwise in a particular case. The terms "about," "substantially," "approximately," and variations thereof, are intended to include the degree of error associated with measurement of the particular quantity based upon the equipment available at the time of filing the application. For example, "about" can include a range of 10%, or ±5%, or ±2% of a given value.

The figures described herein and the written description of specific structures and functions are not presented to limit the scope of what applicants have invented or the scope of the appended claims. Rather, the figures and written description are provided to teach any person skilled in the art to make and use the inventions for which patent protection is sought. Those skilled in the art will appreciate that not all features of a commercial embodiment of the inventions are described or shown for the sake of clarity and understanding. For the sake of brevity, conventional techniques related to making and using aspects of the invention(s) may or may not be described in detail herein, and many conventional implementation details are only mentioned briefly or are omitted entirely. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a" is not intended as limiting of the number of items.

What is claimed is:

1. A computer-implemented method of configuring a disaggregated data center including a plurality of compute nodes communicatively coupled by a communication network to a plurality of distributed memory nodes, the method comprising:

based on receiving, via the communication network, at least one of a plurality of homomorphically-encrypted (HE) logs of memory accesses from each of the plurality of distributed memory nodes, wherein each of the plurality of HE logs includes encrypted metadata comprising access counts and workload memory footprints regarding prior read and write accesses to an associated memory occurring within a predetermined or configurable historical time window, processing circuitry computing a function set S' over each of the plurality of HE logs to obtain a result set R';

the processing circuitry distributing to each of the plurality of distributed memory nodes via the communication network a portion of result set R' computed from the at least one HE log of that memory node and requesting, from each of the plurality of distributed memory nodes, a corresponding portion of plaintext result set R;

the processing circuitry determining an assignment of resources of the plurality of distributed memory nodes based on receiving the plaintext result set R from the plurality of distributed memory nodes, wherein the plaintext result set R indicates memory access counts of workloads executed on the plurality of compute nodes and an amount of memory consumed by the workloads executed on the plurality of compute nodes; and the processing circuitry configuring the disaggregated data center based on the assignment of resources.

2. The method of claim 1, wherein the HE logs comprise logs encrypted by fully homomorphic encryption (FHE).

3. The method of claim 1, further comprising:

memory node processing circuitry of each of the plurality of distributed memory nodes performing fully homomorphic encryption on metadata of at least one memory log of memory accesses in the memory node to obtain the at least one log, wherein the metadata comprises access counts and workload memory footprints regarding prior read and write accesses to an associated memory occurring within a predetermined or configurable historical time window.

4. The method of claim 3, further comprising:

memory node processing circuitry of each of the plurality of distributed memory nodes performing a homomorphic decryption operation on a respective different portion of the result set R' to obtain a respective different portion of plaintext result set R.

5. The method of claim 1, wherein function set S' includes a plurality of different functions.

6. The method of claim 1, wherein the configuring includes updating a memory location with information specifying the assignment.

7. A computer program product, comprising:

one or more computer-readable storage media; and program instructions stored on the one or more computer-readable storage media to perform operations for a disaggregated data center including a plurality of compute nodes communicatively coupled by a communication network to a plurality of distributed memory nodes, the operations including:

based on receiving, via the communication network, at least one of a plurality of homomorphically-encrypted (HE) logs of memory accesses from each of the plurality of distributed memory nodes, wherein each of the plurality of HE logs includes encrypted metadata comprising access counts and workload memory footprints regarding prior read and write accesses to an associated memory occurring within a predetermined or configurable historical time window, computing a function set S' over each of the plurality of HE logs to obtain a result set R';

distributing to each of the plurality of distributed memory nodes via the communication network a portion of result set R' computed from the at least one HE log of that memory node and requesting, from each of the plurality of distributed memory nodes, a corresponding portion of plaintext result set R;

determining an assignment of resources of the plurality of distributed memory nodes based on receiving the plaintext result set R from the plurality of distributed memory nodes, wherein the plaintext result set R indicates memory access counts of workloads executed on the plurality of compute nodes and an amount of memory consumed by the workloads executed on the plurality of compute nodes; and configuring the disaggregated data center based on the assignment of resources.

8. The program product of claim 7, wherein the HE logs comprise logs encrypted by fully homomorphic encryption (FHE).

9. The program product of claim 7, wherein the program product includes program code that further causes memory node processing circuitry of each of the plurality of distributed memory nodes to perform:

encrypting, utilizing fully homomorphic encryption, metadata of at least one memory log of memory accesses in the memory node to obtain the at least one HE log, wherein the metadata comprises access counts and workload memory footprints regarding prior read and write accesses to an associated memory occurring within a predetermined or configurable historical time window.

10. The program product of claim 9, wherein the program product includes program code that further causes the memory node processing circuitry of each of the plurality of distributed memory nodes to perform:

decrypting, in a homomorphic decryption operation, a respective different portion of the result set R' to obtain a respective different portion of plaintext result set R.

11. The program product of claim 7, wherein function set S' includes a plurality of different functions.

12. The program product of claim 7, wherein the configuring includes updating a memory location with information specifying the assignment.

13. A data processing system, comprising:

processing circuitry; and one or more computer-readable storage media communicatively coupled to the processing circuitry, wherein the one or more computer-readable storage media includes program instructions to perform operations to configure a disaggregated data center including a plurality of compute nodes communicatively coupled by a communication network to a plurality of distributed memory nodes, the operations including:

based on receiving, via the communication network, at least one of a plurality of homomorphically-encrypted (HE) logs of memory accesses from each of the plurality of distributed memory nodes, computing a function set S' over each of the plurality of HE logs to obtain a result set R';

distributing to each of the plurality of distributed memory nodes via the communication network a portion of result set R' computed from the at least one HE log of that memory node and requesting, from each of the plurality of distributed memory nodes, wherein each of the plurality of HE logs includes encrypted metadata comprising access counts and workload memory footprints regarding prior read and write accesses to an associated memory occurring within a predetermined or configurable historical time window, a corresponding portion of plaintext result set R;

determining an assignment of resources of the plurality of distributed memory nodes to the plurality of compute nodes based on receiving the plaintext result set R from the plurality of distributed memory nodes, wherein the plaintext result set R indicates memory access counts of workloads executed on the plurality of compute nodes and an amount of memory consumed by the workloads executed on the plurality of compute nodes; and configuring the disaggregated data center based on the assignment of resources.

14. The data processing system of claim 13, wherein the HE logs comprise logs encrypted by fully homomorphic encryption (FHE).

15. The data processing system of claim 13, wherein the program instructions further cause memory node processing circuitry of each of the plurality of distributed memory nodes to perform:

encrypting, utilizing fully homomorphic encryption, metadata of at least one memory log of memory accesses in the memory node to obtain the at least one HE log, wherein the metadata comprises access counts and workload memory footprints regarding prior read and write accesses to an associated memory occurring within a predetermined or configurable historical time window.

16. The data processing system of claim 15, wherein the program product includes program code that further causes the memory node processing circuitry of each of the plurality of distributed memory nodes to perform:

decrypting, in a homomorphic decryption operation, a respective different portion of the result set R' to obtain a respective different portion of plaintext result set R.

17. The data processing system of claim 13, wherein function set S' includes a plurality of different functions.

18. The data processing system of claim 13, wherein the configuring includes updating a memory location with information specifying the assignment.

* * * * *